(12) United States Patent
Javerlhac

(10) Patent No.: US 6,302,041 B1
(45) Date of Patent: Oct. 16, 2001

(54) METHOD FOR CULTIVATING CORN AND SIMILAR CROPS

(76) Inventor: Jean-Charles Javerlhac, Les Rosiers, Guimps, 16300 Barbezieux (FR)

( * ) Notice: Subject to any disclaimer, the term of this patent is extended or adjusted under 35 U.S.C. 154(b) by 0 days.

(21) Appl. No.: 09/555,956
(22) PCT Filed: Dec. 7, 1998
(86) PCT No.: PCT/FR98/02641
    § 371 Date: Aug. 1, 2000
    § 102(e) Date: Aug. 1, 2000
(87) PCT Pub. No.: WO99/29156
    PCT Pub. Date: Jun. 17, 1999

(30) Foreign Application Priority Data

Dec. 8, 1997 (FR) ................................................ 97 154485

(51) Int. Cl.$^7$ .................................................. A01G 7/00
(52) U.S. Cl. .......................................... 111/200; 111/900
(58) Field of Search .............................. 111/14, 200, 900, 111/915, 923

(56) References Cited

FOREIGN PATENT DOCUMENTS

| A1 2 289 101 | 5/1976 | (FR) . |
|---|---|---|
| WO A1 86/05352 | 9/1986 | (WO) . |

OTHER PUBLICATIONS

Krutikow et al., Theorie, Berechnung und Konstruktion der Landmaschinen, Band I: Maschinen und Gerate fur Bodenbearbeitung, Aussaat un Pflanzenpflege, Veb Verlag Technik, Berlin (DD) XP002074424, 1955, pp. 466–469.

Primary Examiner—Christopher J. Novosad
(74) Attorney, Agent, or Firm—Oliff & Berridge, PLC

(57) ABSTRACT

The invention relates to a method of cultivating corn (maize) and analogous crops of similar morphology, the method being of the type in which grains are sown in parallel rows. Along each row, groups of two grains (10-11, 12-13, 14-15) that are spaced apart by a small distance are sown at regular intervals, thereby improving the yield and the early ripening of the harvest.

36 Claims, 2 Drawing Sheets

FIG_3
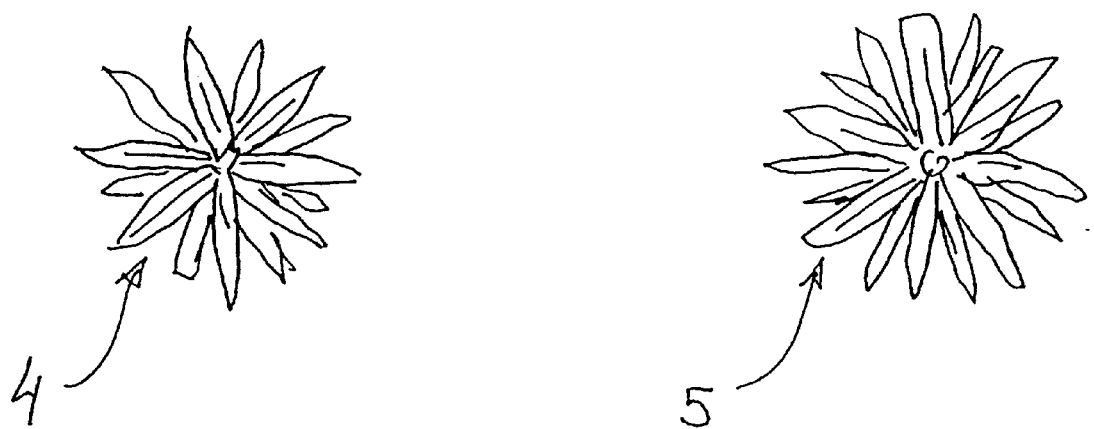
FIG_4
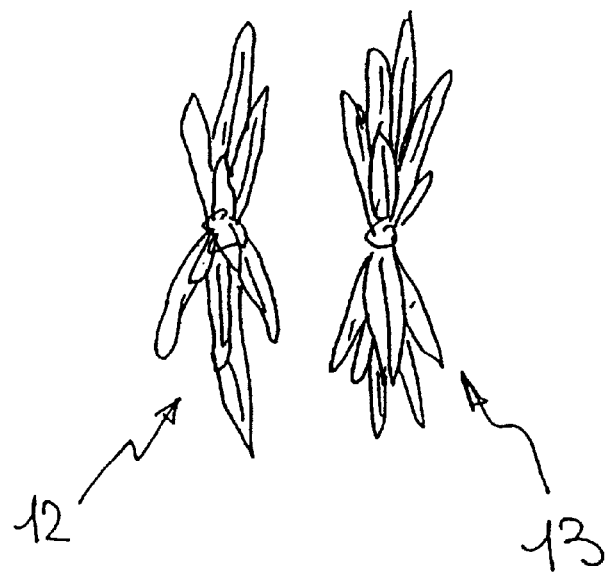

METHOD FOR CULTIVATING CORN AND SIMILAR CROPS

The present invention relates to a novel method of cultivating corn (maize) and analogous plants.

In general corn is sown in parallel rows that are sufficiently spaced apart to allow cultivation implements to pass, and one grain of corn is planted every 25 centimeters, for example.

Corn is conventionally sown using seed drills with rotary distributors that plant the grains individually in the vicinity of a tool that causes them to be buried a little way into the ground.

The invention relates to a method of cultivating corn in which a particular disposition of the grains at the moment of planting enables the corn to develop under better conditions, thereby leading to earlier maturity and to greater yield.

The present invention provides a novel method of cultivating corn and analogous plants, the method being of the type in which the grains are planted in parallel rows, and being characterized by the fact that along each row, groups of two closely-spaced grains are planted at regular intervals, e.g. groups of grains about 7 cm to 12 cm apart.

Thus, although the rows of corn are spaced apart by 50 cm to 100 cm, for example, each group of grains comprises two grains that are spaced apart by about 7 cm to 12 cm and preferably by 8 cm to 9 cm, whereas successive groups are planted at intervals of 25 cm to 45 cm, for example, and preferably at intervals of 30 cm to 35 cm.

Surprisingly, it has been found that planting corn in this manner has a significant influence on the quality of the harvest both in terms of early ripening and in terms of yield.

When, in the state of the art, corn grains are planted at regular intervals of about 15 cm to 20 cm, the corn plants develop with their leaves disposed in substantially regular manner all around the vertical stalk.

In contrast, when the method of the invention, the two corn plants in a given group develop while hindering each other, and as a result the leaves of the two plants remain parallel to each other and develop perpendicularly to the row.

This has the effect of ensuring they receive more sunshine, and are better aired, and as a result they grow under better conditions leading to earlier ripening and increased yield.

Experiments have been performed using the above-described method and they show that a given variety of corn, cultivated using the method of the invention, reaches maturity about one to two weeks earlier than the same variety cultivated in conventional manner, and that the grain yield of the corn was better by about 5% to 10%. This corresponds to an improvement of about 30 points to 40 points on the FAO index.

It is already known to plant corn in bunches of two or three grains placed in random manner with the distances between bunches being about 25 cm to 40 cm, however the random positioning of the grains within any one bunch means that the corn plants grow in disorganized manner in all directions which makes it impossible to obtain the inherent advantages of the present invention whereby the grains are sown on the same row in groups of two while being spaced apart by about 7 cm to 12 cm.

The method as described above is not limited to corn, and is equally applicable to cultivating all plants of the same type, such as sugar cane, for example.

The present invention also provides a single-grain seed drill for implementing the above-described method, the seed drill being characterized by the fact that it plants groups of two grains in the ground, in line at a spacing of about 7 cm to 12 cm, with successive groups being sown about once every 25 cm to 45 cm.

In accordance with the invention, the grains are sown closer together for earlier varieties of corn.

Thus, with early or irrigated varieties, it is possible to sow the two grains of a group about 7 cm apart and to sow one group every 25 cm approximately, thereby giving a row in which the corn grains are spaced apart from one another alternately by about 7 cm and by about 18 cm.

In contrast, with late varieties, the grains can be sown alternately at spacings of about 12 cm and 30 cm, corresponding to one group of grains being planted every 42 cm, approximately.

In order to make the invention better understood, there follows a description by way of example of a particular embodiment as shown in the accompanying drawings, in which:

FIG. 3 is a plan view of two corn plants in accordance with FIG. 1; and

FIG. 4 is a plan view of a group of two corn plants in accordance with the invention as shown in FIG. 2.

FIG. 1 is a diagrammatic plan view of two rows of corn (maize) obtained using the conventional method whereby grains are sown at regular intervals of about 15 cm.

By operating in that manner, it is known that the various corn plants 1, 2, 3, 4, 5, etc. develop vertically with their leaves regularly distributed around their periphery so as to form a kind of continuous hedge leaving practically no gaps between two adjacent corn plants.

Figure 1:
FIG. 1 is a diagrammatic plan view of two rows of corn cultivated using the traditional method.
Figure 1:
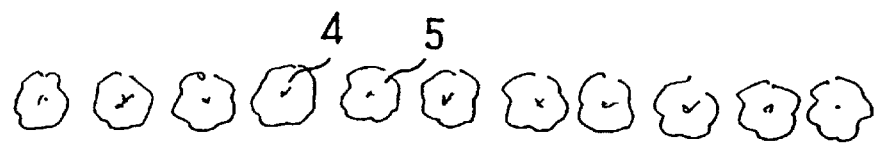
Figure 2:
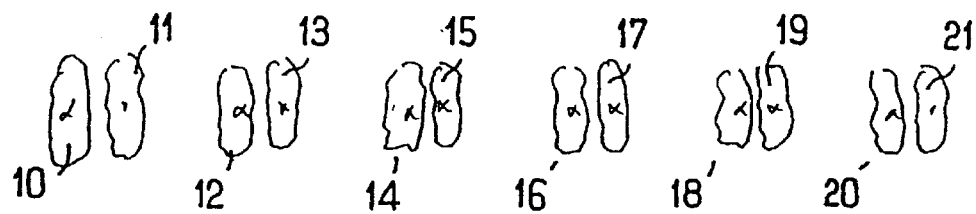
FIG. 2 is a plan view of two rows of corn cultivated in accordance with the invention.
Figure 2:
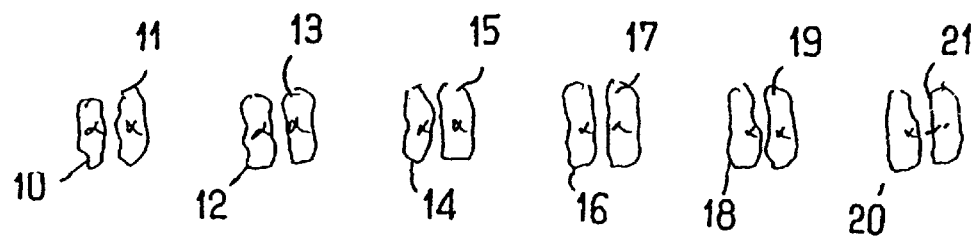

FIG. 2 is a diagrammatic plan view of two rows of corn sown, in accordance with the invention, in groups of two grains that are spaced apart from each other by 8 cm, for example, with one group every 30 cm, approximately, which corresponds to the same density of grains per hectare as in the conventional method of FIG. 1.

As can be seen diagrammatically in FIG. 2, corn plants of the invention grow with their leaves developing perpendicularly to the row so that the midplane of the leaves of any one plant extends perpendicularly to the row in which they were sown.

The way in which the corn plants develop vertically with leaves regularly distributed around them in the known method is shown in plan view in FIG. 3.

In contrast, in the plan view of FIG. 4, it can be seen how corn plants 12 and 13 belonging to the same group of two grains develop with their leaves situated essentially in planes that are perpendicular to the row of corn, thereby enabling them to receive more sunshine and providing better circulation of air between the maize stalks, which as a result ripen earlier and produce more abundantly.

This novel method of cultivation can be applied not only to corn but also to other plants, such as sugar cane for example, which have similar morphology and which are cultivated in rows, while being sufficiently stiff to avoid the use of supports.

The invention can easily be implemented with a seed drill for sowing one grain at a time that has been modified in accordance with the invention so as to sow two grains that are spaced apart by about 7 cm to 12 cm once very 25 cm to 45 cm.

What is claimed is:

1. A method of cultivating crops, comprising the step of sowing grains in parallel rows, wherein along each row the grains are sown in non random manner by groups of two grains separated by a first distance, said groups being separated by a second distance greater than said first distance, and wherein said parallel rows are spaced apart by about 50 to 100 cm.

2. The method of claim 1, wherein said first distance is between 7 and 12 cm.

3. The method of claim 1, wherein said second distance is between 25 and 45 cm.

4. The method of claim 1, wherein said first distance is between 7 and 12 cm and said second distance is between 25 and 45 cm.

5. The method of claim 1, wherein said crops have a corn-like morphology and are sufficiently stiff to be cultivated without the use of support.

6. A method of cultivating crops, comprising the step of sowing grains in parallel rows, wherein along each row the grains are sown by groups of two grains separated by a first distance, said groups being separated by a second distance greater than said first distance, said first and second distances being selected so that two plants belonging to the same group of grains develop with their leaves situated essentially in planes that are perpendicular to the row to which said plants belong, substantially equally from each side of said row.

7. The method of claim 6, wherein said first distance is between 7 and 12 cm and said second distance is between 25 and 45 cm.

8. The method of claim 6, wherein said crops have a corn-like morphology and are sufficiently stiff to be cultivated without the use of support.

9. A method of cultivating crops, comprising the step of sowing grains in parallel rows, wherein along each row the grains are sown by groups of two grains separated by a first distance, said groups being separated by a second distance greater than said first distance and said rows being separated by a third distance greater than said second distance, said first, second and third distances being selected so that two plants belonging to the same group of grains develop with their leaves situated essentially in planes perpendicular to the row to which said plants belong, substantially equally from each side of said row.

10. The method of claim 9, wherein said crops have a corn-like morphology and are sufficiently stiff to be cultivated without the use of support.

11. A method of cultivating crops, comprising the step of sowing grains in parallel rows, wherein along each row the grains are sown by groups of two grains separated by a first distance, said groups being separated by a second distance greater than said first distance, and wherein said parallel rows are spaced apart by a substantially constant distance.

12. The method of claim 11, wherein said crops have a corn-like morphology and are sufficiently stiff to be cultivated without the use of support.

13. A method of cultivating crops, comprising the step of sowing grains in parallel rows, wherein along each row the grains are sown by groups of two grains separated by a first distance that is substantially constant, said groups being separated by a second distance greater than said first distance, and wherein said parallel rows are spaced apart by a third distance greater than said second distance.

14. The method of claim 13, wherein said crops have a corn-like morphology and are sufficiently stiff to be cultivated without the use of support.

15. A method of cultivating crops, comprising the step of sowing grains in parallel rows, wherein along each row the grains are sown by groups of two grains separated by 7 to 12 cm, said groups being separated by 25 to 45 cm, and said parallel rows being separated by 50 to 100 cm.

16. The method of claim 15, wherein said crops have a corn-like morphology and are sufficiently stiff to be cultivated without the use of support.

17. A method of cultivating maize, comprising the step of sowing grains in parallel rows, wherein along each row the grains are sown by groups of two grains separated by a first distance, said groups being separated by a second distance greater than said first distance, said first and second distances being selected so that two plants belonging to the same group of grains develop with their leaves situated essentially in planes that are perpendicular to the row to which said plants belong, substantially equally from each side of said row.

18. A method of cultivating maize as claimed in claim 17, wherein said parallel rows of two grains are sown in non random manner, and wherein said parallel rows are spaced apart by about 50 to 100 cm.

19. The method of claim 18, wherein said first distance is between 7 and 12 cm and said second distance is between 25 and 45 cm.

20. The method of claim 17, wherein said first distance is between 7 and 12 cm.

21. The method of claim 17, wherein said second distance is between 25 and 45 cm.

22. The method of claim 17, wherein said first distance is between 7 and 12 cm and said second distance is between 25 and 45 cm.

23. A method of cultivating maize as claimed in claim 17, said rows being separated by a third distance greater than said second distance, and said first, second and third distances being selected so that two plants belonging to the same group of grains develop with their leaves situated essentially in planes perpendicular to the row to which said plants belong, substantially equally from each side of said row.

24. A method of cultivating maize as claimed in claim 17, wherein along each said row said sown grains are separated by said first distance, said first distance being substantially constant, and wherein said parallel rows are spaced apart by a substantially constant distance.

25. A method of cultivating maize as claimed in claim 17, wherein along each said row said sown grains are separated by said first distance, said first distance being substantially constant, and wherein said parallel rows are spaced apart by a third distance greater than said second distance.

26. A method of cultivating maize as claimed in claim 17, Wherein along each said row said two grains are separated by 7 to 12 cm, said groups are separated by 25 to 45 cm, and said parallel rows are separated by 50 to 100 cm.

27. A method of cultivating sugar cane, comprising the step of sowing grains in parallel rows, wherein along each row the grains are sown in non random manner by groups of two grains separated by a first distance, said groups being separated by a second distance greater than said first distance, and wherein said parallel rows are spaced apart by about 50 to 100cm.

28. The method of claim 27, wherein said first distance is between 7 and 12 cm.

29. The method of claim 27, wherein said second distance is between 25 and 45 cm.

30. The method of claim 27, wherein said first distance is between 7 and 12 cm and said second distance is between 25 and 45 cm.

31. A method of cultivating sugar cane, comprising the step of sowing grains in parallel rows, wherein along each row the grains are sown by groups of two grains separated by a first distance, said groups being separated by a second distance greater than said first distance, said first and second distances being selected so that two plants belonging to the same group of grains develop with their leaves situated essentially in planes that are perpendicular to the row to which said plants belong, substantially equally from each side of said row.

32. The method of claim 31, wherein said first distance is between 7 and 12 cm and said second distance is between 25 and 45 cm.

33. A method of cultivating sugar cane, comprising the step of sowing grains in parallel rows, wherein along each row the grains are sown by groups of two grains separated by a first distance, said groups being separated by a second distance greater than said first distance and said rows being separated by a third distance greater than said second distance, said first, second and third distances being selected so that two plants belonging to the same group of grains develop with their leaves situated essentially in planes perpendicular to the row to which said plants belong, substantially equally from each side of said row.

34. A method of cultivating sugar cane, comprising the step of sowing grains in parallel rows, wherein along each row the grains are sown by groups of two grains separated by a first distance, said groups being separated by a second distance greater than said first distance, and wherein said parallel rows are spaced apart by a substantially constant distance.

35. A method of cultivating sugar cane, comprising the step of sowing grains in parallel rows, wherein along each row the grains are sown by groups of two grains separated by a first distance substantially constant, said groups being separated by a second distance greater than said first distance, and wherein said parallel rows are spaced apart by a third distance greater than said second distance.

36. A method of cultivating sugar cane, comprising the step of sowing grains in parallel rows, wherein along each row the grains are sown by groups of two grains separated by 7 to 12 cm, said groups being separated by 25 to 45 cm, and said parallel rows being separated by 50 to 100 cm.

* * * * *